(12) United States Patent
Na et al.

(10) Patent No.: US 11,627,265 B2
(45) Date of Patent: Apr. 11, 2023

(54) IMAGE SENSOR AND METHOD OF MONITORING THE SAME

(71) Applicant: SAMSUNG ELECTRONICS CO., LTD., Suwon-si (KR)

(72) Inventors: Hoyong Na, Daegu (KR); Shinyeol Choi, Seoul (KR); Kyuik Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 17/036,006

(22) Filed: Sep. 29, 2020

(65) Prior Publication Data

US 2021/0274159 A1    Sep. 2, 2021

(30) Foreign Application Priority Data

Feb. 28, 2020  (KR) .................. 10-2020-0024787

(51) Int. Cl.
*H04N 5/369* (2011.01)
*H04N 17/00* (2006.01)
*H04N 5/3745* (2011.01)
*H04N 5/374* (2011.01)
*H04N 5/376* (2011.01)
*H04N 5/378* (2011.01)

(52) U.S. Cl.
CPC ......... *H04N 5/36963* (2018.08); *H04N 5/374* (2013.01); *H04N 5/376* (2013.01); *H04N 5/379* (2018.08); *H04N 5/37452* (2013.01); *H04N 5/37455* (2013.01); *H04N 17/002* (2013.01); *H04N 5/378* (2013.01)

(58) Field of Classification Search
CPC .... H04N 5/36963; H04N 5/379; H04N 5/374; H04N 5/37452; H04N 5/37455; H04N 5/376; H04N 17/002; H04N 5/378
See application file for complete search history.

(56) References Cited

U.S. PATENT DOCUMENTS

| | | | |
|---|---|---|---|
| 6,344,877 B1* | 2/2002 | Gowda | ............... H04N 5/3575 348/308 |
| 8,890,047 B2 | 11/2014 | Solhusvik et al. | |
| 9,406,713 B2 | 8/2016 | Fan | |
| 9,998,700 B1 | 6/2018 | Johansson | |
| 2008/0239112 A1 | 10/2008 | Naito | |
| 2018/0091726 A1* | 3/2018 | Furumochi | ....... H01L 27/14634 |

FOREIGN PATENT DOCUMENTS

| | | |
|---|---|---|
| JP | 4453332 B2 | 4/2010 |
| KR | 10-0707069 B1 | 4/2007 |
| KR | 10-0736528 B1 | 7/2007 |

* cited by examiner

*Primary Examiner* — Nicholas G Giles
(74) *Attorney, Agent, or Firm* — Sughrue Mion, PLLC

(57) ABSTRACT

An image sensor includes a pixel array, a row driver, a detector, an analog-to-digital converter and a controller. The pixel array includes a pixel area including a pixel and a dummy area including a monitoring circuit. The dummy area is disposed on a same substrate as the pixel area. The dummy area is disposed adjacent to the pixel area. The row driver is configured to output a driving signal to the pixel and the monitoring circuit. The detector is configured to receive a monitoring signal from the monitoring circuit. The analog-to-digital converter is configured to receive an analog signal corresponding to an incident light from the pixel and to convert the analog signal to a digital signal. The controller is configured to control the row driver and the analog-to-digital converter.

21 Claims, 16 Drawing Sheets

IMAGE SENSOR AND METHOD OF MONITORING THE SAME

CROSS-REFERENCE TO RELATED APPLICATION

This U.S. non-provisional application is based on and claims priority under 35 USC § 119 to Korean Patent Application No. 10-2020-0024787, filed on Feb. 28, 2020, in the Korean Intellectual Property Office (KIPO), the disclosure of which is incorporated by reference herein in its entirety.

BACKGROUND

1. Technical Field

Example embodiments relate generally to a semiconductor integrated circuit, and more particularly to an image sensor and a method of monitoring the image sensor.

2. Related Art

An image sensor is an image pickup device, which uses semiconductor material that responsive to light. The image sensor may have a very large number of pixels that respectively detect light. Each pixel may convert photons to electro-hole pairs to accumulate a charge and the amount of accumulated charge depends on light intensity and illumination time interval. As such the image sensor may convert the incident light into electric quantity.

The image sensor may include a pixel array including a plurality of pixels and a row driver driving the pixels in units of rows. When an error occurs in a driving signal output from the row driver or an error occurs in a signal transmitting line, the image sensor may not normally operate. In addition, when the image sensor is applied to an automobile and the image sensor does not normally operate, an accident of the automobile may occur.

SUMMARY

Some example embodiments may provide an image sensor capable of monitoring a driving signal output from a row driver.

Some example embodiments may also provide a method of monitoring the image sensor.

According to an aspect of the disclosure, there is provided an image sensor comprising: a pixel array including a pixel area and a dummy area, the pixel area including a pixel, the dummy area including a monitoring circuit, and the dummy area being provided on a same substrate as the pixel area and adjacent to the pixel area; a row driver configured to output a driving signal to the pixel and the monitoring circuit; a detector configured to receive a monitoring signal from the monitoring circuit; an analog-to-digital converter configured to receive an analog signal corresponding to an incident light from the pixel and to convert the analog signal to a digital signal; and a controller configured to control the row driver and the analog-to-digital converter.

According to another aspect of the disclosure, there is provided a method of monitoring an image sensor, the method comprising: outputting a driving signal to a pixel provided in a pixel area of a pixel array and a monitoring circuit provided in a dummy area of the pixel array, the dummy area being provided on a same substrate as the pixel area and adjacent to the pixel area; and receiving a monitoring signal from the monitoring circuit.

According to another aspect of the disclosure, there is provided an image sensor comprising: a pixel array comprising a pixel area including a pixel and a dummy area including a first monitoring circuit, a second monitoring circuit and a third monitoring circuit, a row driver configured to output a driving signal to the pixel, the first monitoring circuit, the second monitoring circuit and the third monitoring circuit; and a detector configured to receive a first monitoring signal, a second monitoring signal and a third monitoring signal from the first monitoring circuit, the second monitoring circuit and the third monitoring circuit respectively, wherein the first monitoring circuit comprises a first monitoring transistor configured to receive a transfer control signal and a second monitoring transistor coupled to the first monitoring transistor and configured to receive a selection signal, the first monitoring circuit being configured to output the first monitoring signal, wherein the second monitoring circuit comprises a third monitoring transistor configured to receive a reset signal and a fourth monitoring transistor coupled to the third monitoring transistor and configured to receive the selection signal, the second monitoring circuit being configured to output the second monitoring signal, wherein the third monitoring circuit comprising a fifth monitoring transistor configured to receive the selection signal and a sixth monitoring transistor coupled to the fifth monitoring transistor and configured to receive the selection signal, the third monitoring circuit being configured to output the third monitoring signal.

According to another aspect of the disclosure, there is provided an image sensor comprising: a pixel array; a pixel provided on a pixel area of the pixel array; a monitoring circuit provided on a dummy area of the pixel array; a row driver configured to output a driving signal to the pixel and the monitoring circuit; a detector configured to receive a monitoring signal from the monitoring circuit and detect an error in the pixel array based on the monitoring signal, wherein the dummy area disposed on a same substrate as the pixel area and the dummy area disposed adjacent to the pixel area.

BRIEF DESCRIPTION OF THE DRAWINGS

Example embodiments of the disclosure will be more clearly understood from the following detailed description taken in conjunction with the accompanying drawings.

DETAILED DESCRIPTION OF THE EMBODIMENTS

Figure 1:
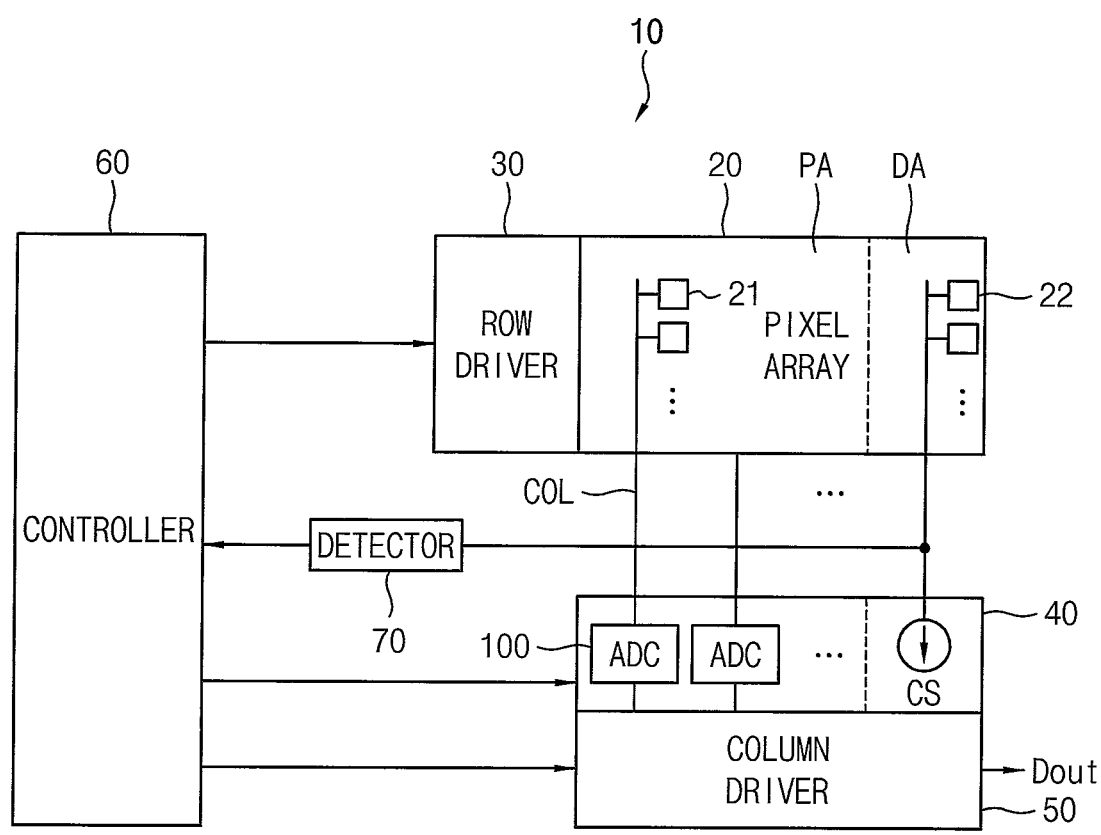
FIG. 1 is a block diagram illustrating an image sensor according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating an image sensor according to example embodiments.

Referring to FIG. 1, an image sensor 10 may include a pixel array 20, a row driver 30, an analog-to-digital converter (ADC) 40, a column driver 50, a controller 60 and a detector 70.

The pixel array 20 may include a pixel area PA and a dummy area DA. The dummy area DA may be disposed on a same plane as the pixel area PA. The dummy area DA may be disposed adjacent to the pixel area PA.

The pixel area PA includes a plurality of pixels 21 coupled to column lines COL, respectively, and the plurality of pixels 21 senses incident lights to generate analog signals through the column lines COL. The plurality of pixels 21 may be arranged in a matrix form of a plurality rows and a plurality of columns.

The dummy area DA includes a plurality of monitoring circuits 22 outputting a monitoring signal. According to an example embodiment, the monitoring circuits 22 may be coupled to a monitoring line extending in a column direction.

The row driver 30 may be coupled to the rows of the pixel array 20 to generate driving signals for driving the rows. For example, the row driver 30 may drive the pixels in the pixel array 20 in units of the rows. The row driver 30 may output the driving signal to the pixel 21 and the monitoring circuit 22.

As shown in FIG. 1, the dummy area DA may be disposed in a first side of the pixel area PA and the row driver 30 may be disposed in a second side of the pixel area PA opposite to the first side.

The analog-to-digital converter 40 may be coupled to the columns of the pixel array 20 to convert the analog signals from the pixel array 20 to digital signals. The analog-to-digital converter 40 may include a plurality of unit analog-to-digital converters 100. Each of the unit analog-to-digital converters 100 may be delta-sigma analog-to-digital converters for performing a delta-sigma modulation and a digital filtering to convert the analog signals to the digital signals.

The analog-to-digital converter 40 may include a correlated double sampling (CDS) unit. In an exemplary embodiment, the CDS unit may perform an analog double sampling of extracting a valid image component based on a difference between an analog reset signal and an analog image signal. In another exemplary embodiment, the CDS unit may perform a digital double sampling of converting the analog reset signal and the analog image signal to two digital signals and extracting a difference between the two digital signals as the valid image component. In still another exemplary embodiment, the CDS unit may perform a dual CDS of performing both of the analog double sampling and the digital double sampling.

The column driver 50 may output the digital signals from the analog-to-digital converter 40 sequentially as output data Dout.

The controller 60 may control the row driver 30, the analog-to-digital converter 40 and the column driver 50. The controller 60 may provide control signals such as clock signals, timing control signals, etc. required for the operations of the row driver 30, the analog-to-digital converter 40 and the column driver 50. The controller 60 may include a control logic circuit, a phase-locked loop, a timing control circuit, a communication interface circuit, etc.

The detector 70 may receive the monitoring signal from the monitoring circuit 22. The detector 70 may detect a horizontal line error of the pixel array 20 based on the monitoring signal. When the horizontal line error is occurred, the detector 70 may output an error signal to the controller 60. According to an example embodiment, the monitoring circuits 22 in the dummy area DA may be connected to a current source CS.

For example, when the horizontal line error is occurred, the controller 60 may generate an error message and display the error message to a user. For example, when the image sensor 10 is used as a front camera or a rear camera of an automobile and the error message is displayed to the user, the horizontal line error may be notified to the user so that an accident may be prevented.

Figure 2:
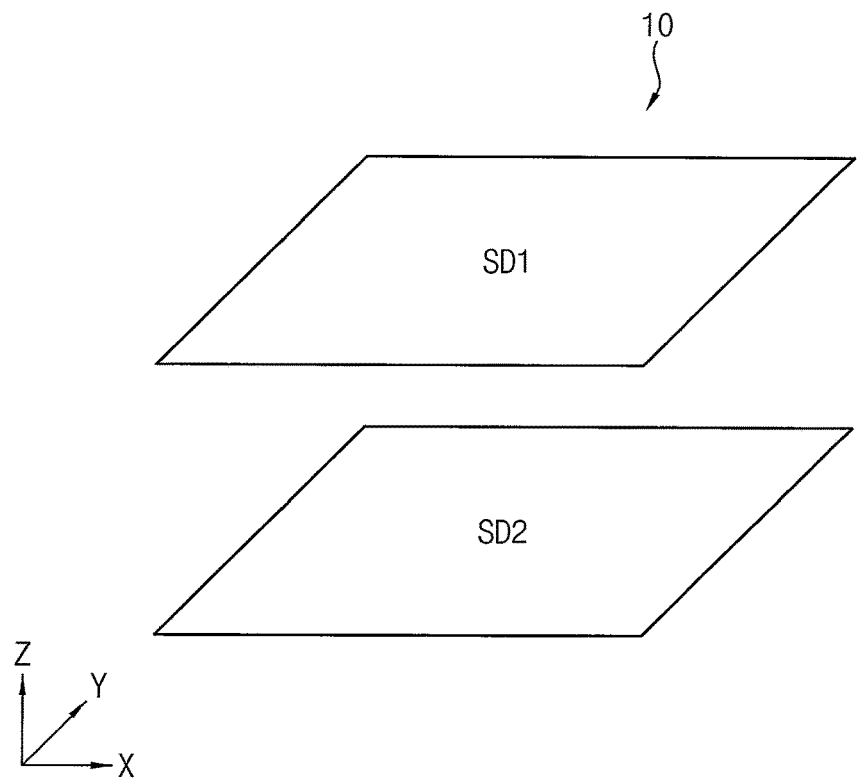
FIG. 2 is a conceptual diagram illustrating layer structures of the image sensor of FIG. 1.

FIG. 2 is a conceptual diagram illustrating layer structures of the image sensor 10 of FIG. 1.

Referring to FIGS. 1 and 2, the image sensor 10 may have a structure in which a plurality of semiconductor substrates is stacked in a vertical direction Z, and the plurality of semiconductor substrates include a first semiconductor substrate SD1 and a second semiconductor substrate SD2 disposed below the first semiconductor substrate SD1. A row direction X and a column direction Y may be perpendicular to each other and parallel with the surfaces of the semiconductor substrates. The pads on the bottom surface of the first semiconductor substrate SD1 and the pads on the top surface of the second semiconductor substrate SD2 may be formed at the corresponding positions, and the first semiconductor substrate SD1 and the second semiconductor substrate SD2 may be connected by coupling the pads.

For example, the pixel array 20 may be disposed on the first semiconductor substrate SD1. The row driver 30, the analog-to-digital converter 40, the column driver 50, the controller 60 and the detector 70 may be disposed on the second semiconductor substrate SD2 overlapping the first semiconductor substrate SD1.

Figure 3:
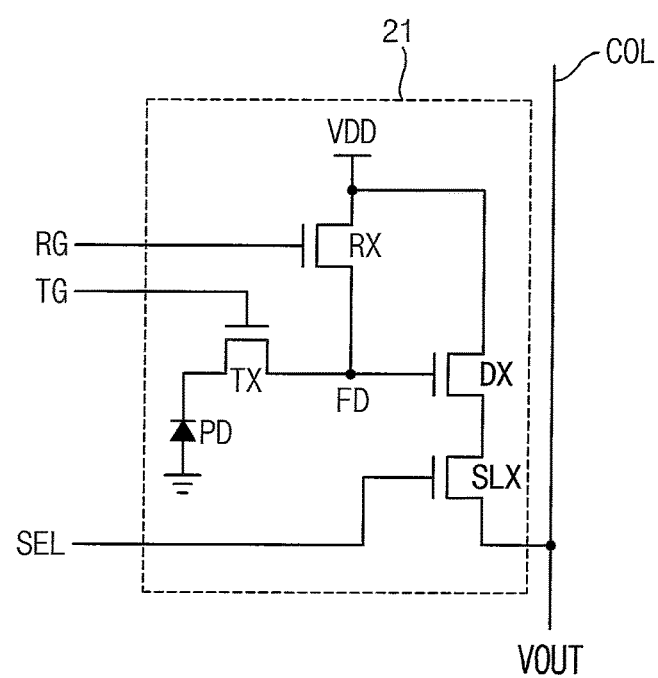
FIG. 3 is a circuit diagram illustrating a pixel of FIG. 1.

FIG. 3 is a circuit diagram illustrating the pixel 21 of FIG. 1.

Referring to FIGS. 1 to 3, the pixel 21 may include a photo-sensitive element such as a photodiode PD, and a readout circuit including a transfer transistor TX, a reset transistor RX, a drive transistor DX and a selection transistor SLX.

For example, the photodiode PD may include an n-type region in a p-type substrate such that the n-type region and the p-type substrate form a p-n conjunction diode. The photodiode PD receives the incident light and generates a photo-charge based on the incident light.

In some example embodiments, the pixel 21 may include a phototransistor, a photogate, a pinned photodiode, etc. instead of, or in addition to, the photodiode PD.

The photo-charge generated in the photodiode PD may be transferred to a floating diffusion node FD through the transfer transistor TX. The transfer transistor TX may be turned on in response to a transfer control signal TG.

The drive transistor DX functions as a source follower amplifier that amplifies a signal corresponding to the charge on the floating diffusion node FD. The selection transistor SLX may transfer the amplified signal VOUT to a column line COL in response to a selection signal SEL. The drive transistor DX may be coupled to the selection transistor SLX in series.

The floating diffusion node FD may be reset by the reset transistor RX. For example, the reset transistor RX may discharge the floating diffusion node FD in response to a reset signal RG for correlated double sampling (CDS).

According to an example embodiment, the reset transistor RX and the drive transistor DX may be connected to power line VDD.

Figure 4:
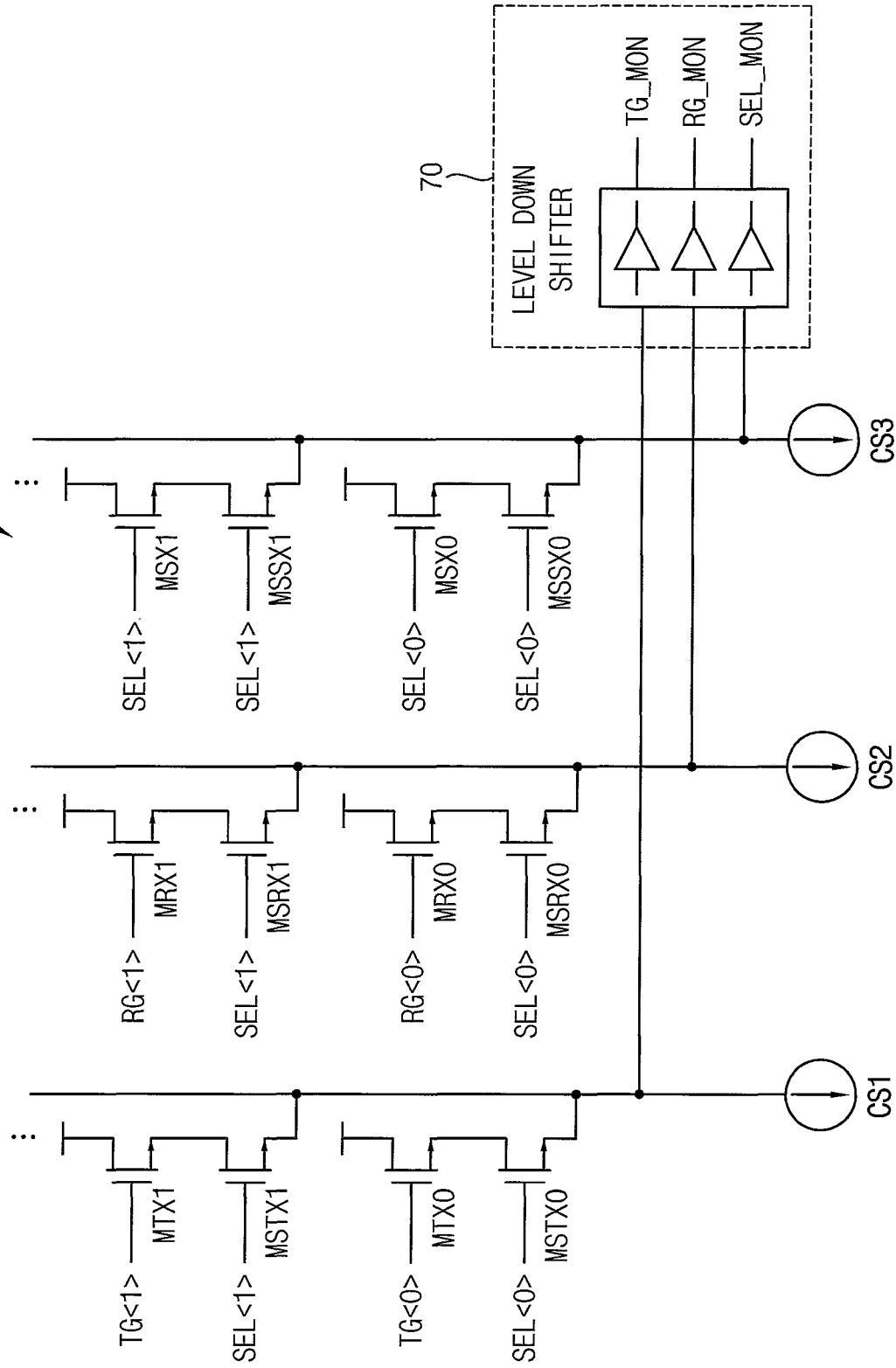
FIG. 4 is a circuit diagram illustrating a monitoring circuit of FIG. 1.

FIG. 4 is a circuit diagram illustrating the monitoring circuit 22 of FIG. 1.

Referring to FIGS. 1, 3 and 4, the pixel 21 and the monitoring circuit 22 receive a first driving signal, a second driving signal and a third driving signal. For example, the first driving signal may be the transfer control signal TG of the pixel 21, the second driving signal may be the reset signal RG of the pixel 21 and the third driving signal may be the selection signal SEL of the pixel 21.

The monitoring circuit 22 may output a first monitoring signal TG_MON based on the first driving signal TG and the third driving signal SEL. The monitoring circuit 22 may output a second monitoring signal RG_MON based on the second driving signal RG and the third driving signal SEL. The monitoring circuit 22 may output a third monitoring signal SEL_MON based on the third driving signal SEL.

In the example embodiment, the monitoring circuit 22 may include at least two n-type monitoring transistors coupled to each other in series.

A first row of the monitoring circuit 22 may receive the driving signal (e.g. TG<0>, RG<0> and SEL<0>) same as the driving signal of a first row of the pixel 21. A second row of the monitoring circuit 22 may receive the driving signal (e.g. TG<1>, RG<1> and SEL<1>) same as the driving signal of a second row of the pixel 21.

The first row of the monitoring circuit 22 may include a first monitoring circuit including a first monitoring transistor MTX0 receiving the transfer control signal TG<0> and a second monitoring transistor MSTX0 coupled to the first monitoring transistor MTX0 and receiving the selection signal SEL<0>. The first monitoring circuit may output the first monitoring signal TG_MON. The first monitoring circuit may be coupled to a first current source CS1.

The first row of the monitoring circuit 22 may further include a second monitoring circuit including a third monitoring transistor MRX0 receiving the reset signal RG<0> and a fourth monitoring transistor MSRX0 coupled to the third monitoring transistor MRX0 and receiving the selection signal SEL<0>. The second monitoring circuit may output the second monitoring signal RG_MON. The second monitoring circuit may be coupled to a second current source CS2.

The first row of the monitoring circuit 22 may further include a third monitoring circuit including a fifth monitoring transistor MSX0 receiving the selection signal SEL<0> and a sixth monitoring transistor MSSX0 coupled to the fifth monitoring transistor MSX0 and receiving the selection signal SEL<0>. The third monitoring circuit may output the third monitoring signal SEL_MON. The third monitoring circuit may be coupled to a third current source CS3.

Similarly to the first row of the monitoring circuit 22, a second row of the monitoring circuit 22 may include a first monitoring circuit including first and second monitoring transistors MTX1 and MSTX1, a second monitoring circuit including third and fourth monitoring transistors MRX1 and MSRX1 and a third monitoring circuit including fifth and sixth monitoring transistors MSX1 and MSSX1.

The first monitoring circuit in the first row of the monitoring circuit 22 may be coupled to the first monitoring circuit in the second row of the monitoring circuit 22. The second monitoring circuit in the first row of the monitoring circuit 22 may be coupled to the second monitoring circuit in the second row of the monitoring circuit 22. The third monitoring circuit in the first row of the monitoring circuit 22 may be coupled to the third monitoring circuit in the second row of the monitoring circuit 22.

The detector 70 may include a level down shifter to decrease levels of the first monitoring signal TG_MON, the second monitoring signal RG_MON and the third monitoring signal SEL_MON. The monitoring signal TG_MON, the second monitoring signal RG_MON and the third monitoring signal SEL_MON may be converted from analog levels to digital levels by the level down shifter. According to an example embodiment, the monitor 70 may include circuitry to implement a level down shifter.

Figure 5:
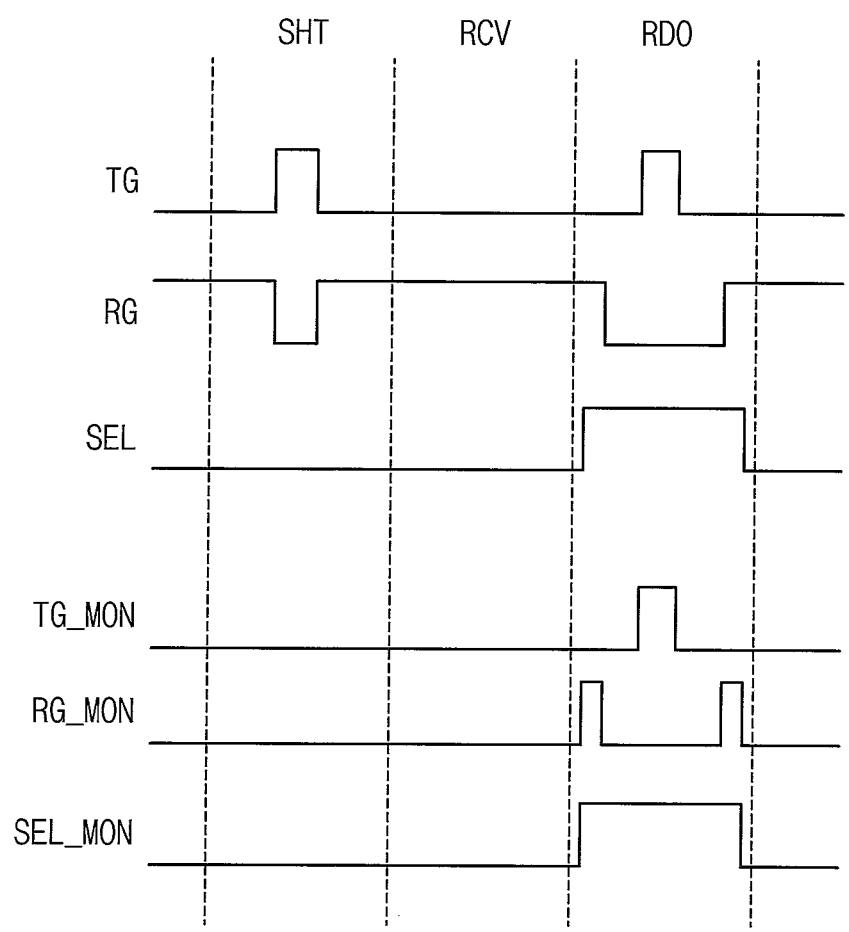
FIGS. 5 and 6 are timing diagrams illustrating a driving signal of the pixel of FIG. 1 and a monitoring signal monitored by the monitoring circuit of FIG. 1.
Figure 6:
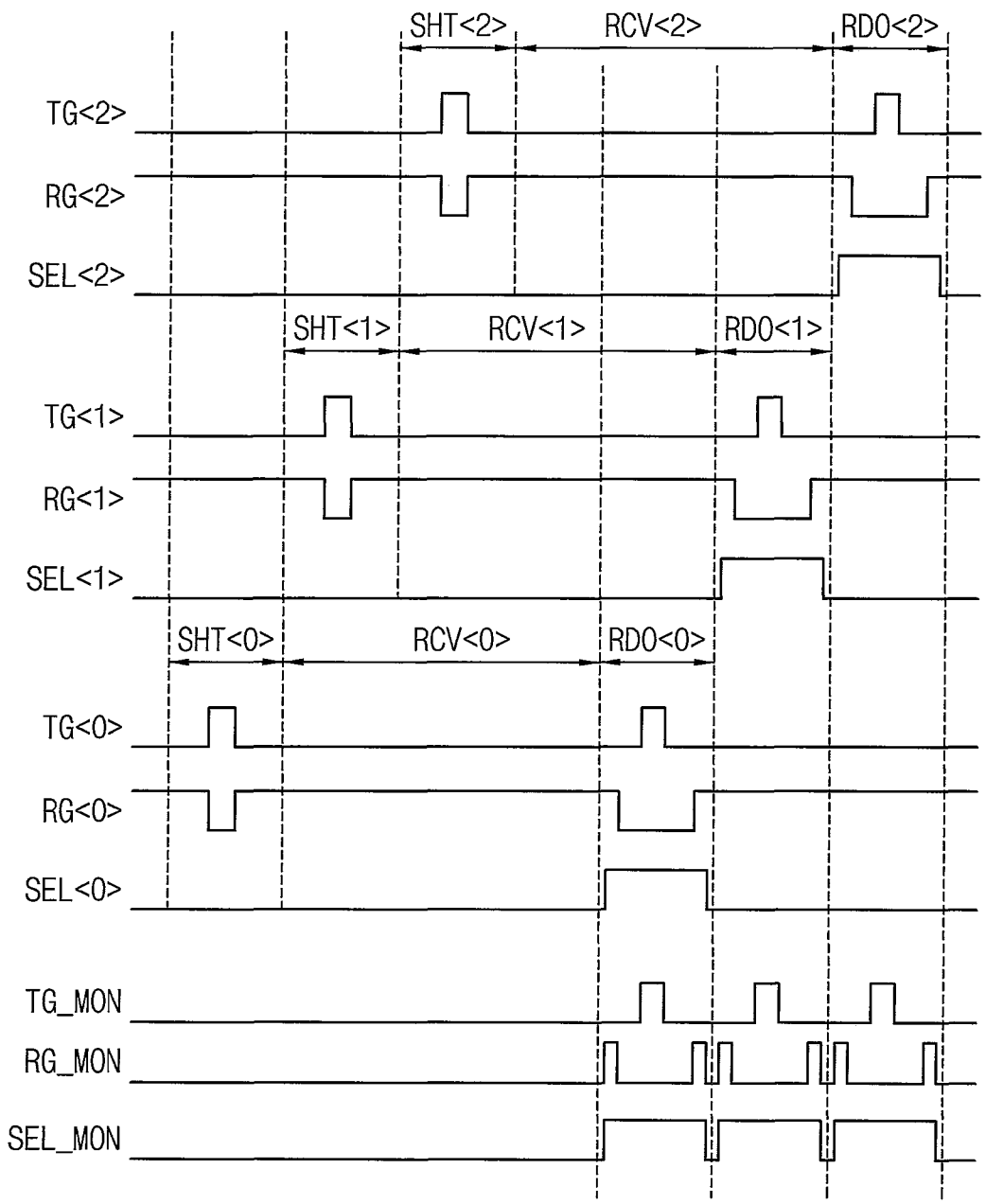

FIGS. 5 and 6 are timing diagrams illustrating the driving signal TG, RG and SEL of the pixel 21 of FIG. 1 and the monitoring signal TG_MON, RG_MON and SEL_MON monitored by the monitoring circuit 22 of FIG. 1.

Referring to FIGS. 1 and 3 to 6, the pixel 21 of the image sensor 10 may operate in a shutter period SHT, a receiving period RCV and a readout period RDO.

In a first period of the shutter period SHT, the transfer transistor TX is turned on in response to the transfer control signal TG. In a second period of the shutter period SHT, the reset transistor RX is turned on in response to the reset signal RG so that the floating diffusion node FD is reset.

During the receiving period RCV, the transfer control signal TG may maintain an inactive level, the reset signal RG may maintain an active level and the selection signal SEL may maintain an inactive level. During the receiving period RCV, the photodiode PD may receive light.

During the readout period RDO, the selection signal SEL may maintain an active level. When the transfer control signal TG is activated in the readout period RDO, the level of the light received by the photodiode PD may be transferred to the floating diffusion node FD. When the transfer control signal TG is converted from an active level to the inactive level in the readout period RDO, a data corresponding to the level of the received light may be read out through the column line COL.

When the reset signal RG is activated again and the selection signal SEL is inactivated in the readout period RDO, the floating diffusion node FD is reset so that the readout operation is finished.

In FIG. 6, the timings of the transfer control signal TG<0>, the reset signal RG<0> and the selection signal SEL<0> according to the shutter period SHT<0>, the receiving period RCV<0> and the readout period RDO<0> corresponding to the first row, the timings of the transfer control signal TG<1>, the reset signal RG<1> and the selection signal SEL<1> according to the shutter period SHT<1>, the receiving period RCV<1> and the readout period RDO<1> corresponding to the second row, the timings of the transfer control signal TG<2>, the reset signal RG<2> and the selection signal SEL<2> according to the shutter period SHT<2>, the receiving period RCV<2> and the readout period RDO<2> corresponding to the third row, and the timings of the first monitoring signal TG_MON, the second monitoring signal RG_MON and the third monitoring signal SEL_MON according to the above explained signals TG, RG and SEL are described.

In a normal state, the first monitoring signal TG_MON may have a waveform generated by AND operation of the transfer control signal TG and the selection signal SEL, the second monitoring signal RG_MON may have a waveform generated by AND operation of the reset signal RG and the selection signal SEL and the third monitoring signal SEL_MON may have a waveform same as the waveform of the selection signal SEL.

According to the example embodiment, the monitoring circuit 22 is formed at the dummy area DA of the pixel array 20 so that the driving signal TG, RG and SEL output from the row driver 30 may be monitored by the monitoring circuit 22. In addition, in a structure including the first semiconductor substrate SD1 where the pixel array 20 is formed and the second semiconductor substrate SD2 where the row driver 30 and the analog-to-digital converter 40 are formed, the monitoring circuit 22 is formed in the dummy area DA of the pixel array 20 so that an increase of a size of the image sensor 10 due to a contact portion connecting the first semiconductor substrate SD1 and the second semiconductor substrate SD2 may be minimized.

Figure 7:
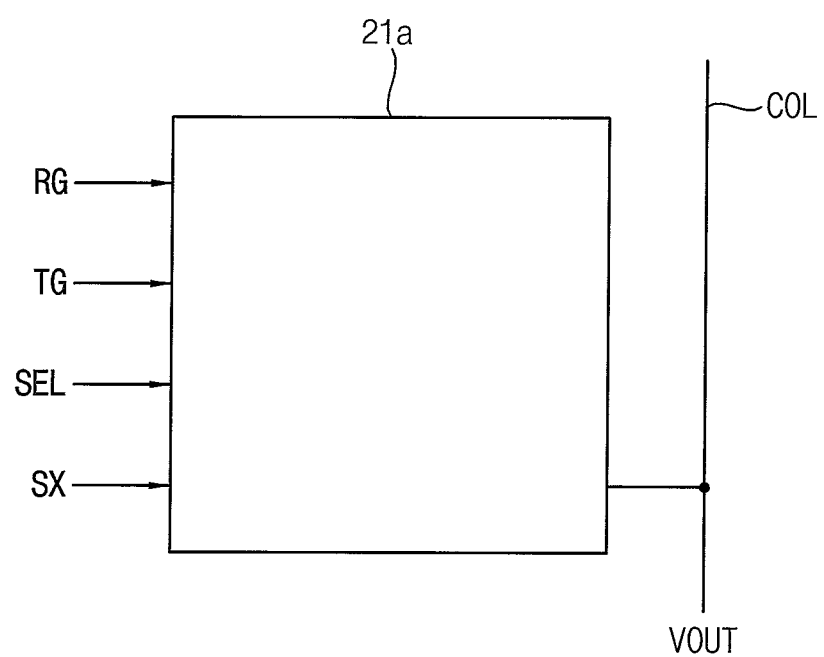
FIG. 7 is a conceptual diagram illustrating a pixel of an image sensor according to example embodiments.
Figure 8:
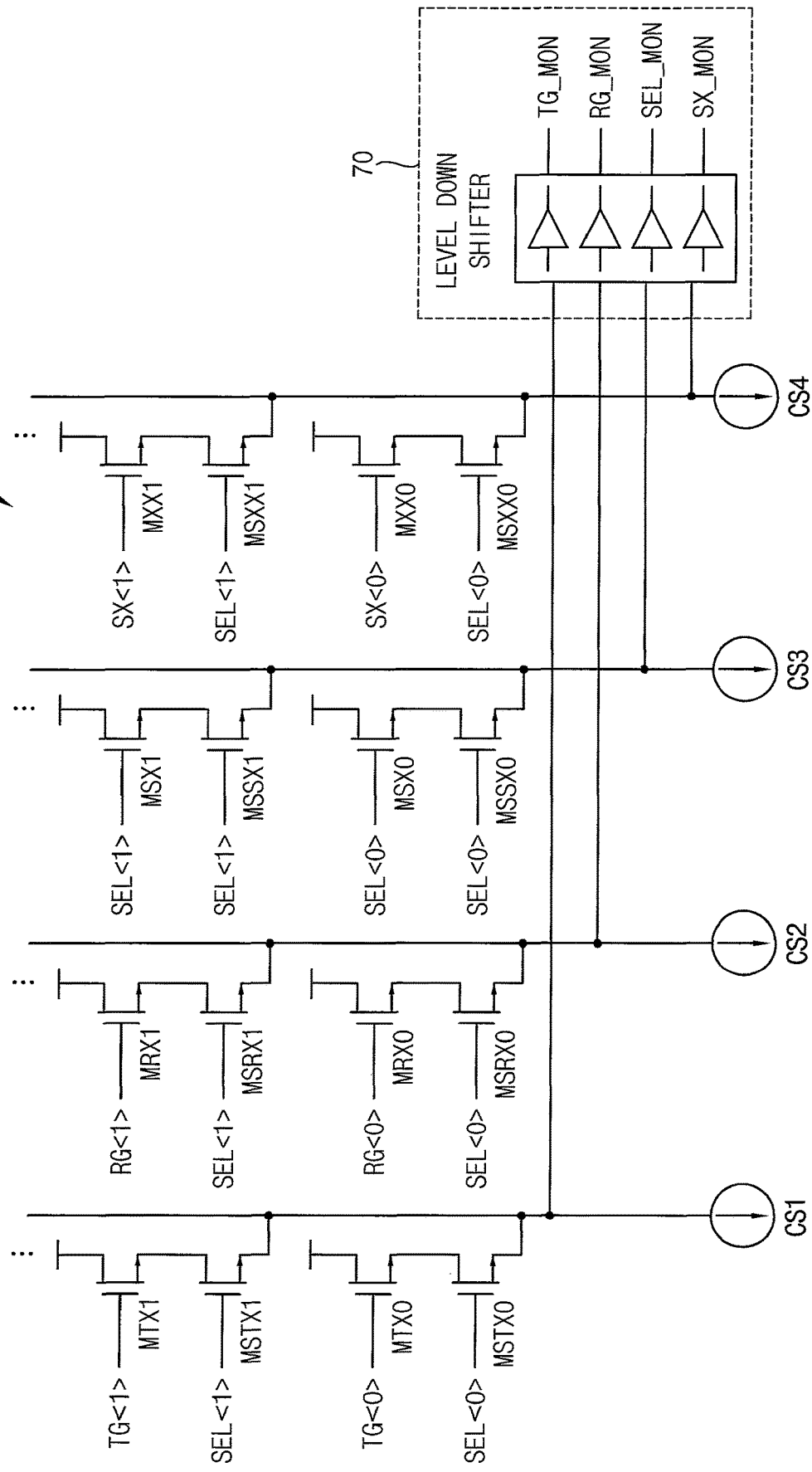
FIG. 8 is a circuit diagram illustrating a monitoring circuit of the image sensor of FIG. 7.

FIG. 7 is a conceptual diagram illustrating a pixel of an image sensor according to example embodiments. FIG. 8 is a circuit diagram illustrating a monitoring circuit of the image sensor of FIG. 7.

The image sensor and the method of monitoring the image sensor according to the example embodiment is substantially the same as the image sensor and the method of monitoring the image sensor of the previous example embodiment explained referring to FIGS. 1 to 6 except that the pixel 21a of the image sensor further receives a fourth driving signal SX and the monitoring circuit 22a further outputs a fourth monitoring signal SX_MON. Thus, the same reference numerals will be used to refer to the same or like parts as those described in the previous example embodiment of FIGS. 1 to 6 and any repetitive explanation concerning the above elements will be omitted.

Referring to FIGS. 1, 2, 7 and 8, the pixel 21a and the monitoring circuit 22a receive a first driving signal, a second driving signal, a third driving signal and a fourth driving signal. For example, the first driving signal may be the transfer control signal TG of the pixel 21a, the second driving signal may be the reset signal RG of the pixel 21a, the third driving signal may be the selection signal SEL of the pixel 21a and the fourth driving signal may be an additional signal of the pixel 21a.

The monitoring circuit 22a may output a first monitoring signal TG_MON based on the first driving signal TG and the third driving signal SEL. The monitoring circuit 22a may output a second monitoring signal RG_MON based on the second driving signal RG and the third driving signal SEL. The monitoring circuit 22a may output a third monitoring signal SEL_MON based on the third driving signal SEL. The monitoring circuit 22a may output a fourth monitoring signal SX_MON based on the third driving signal SEL and the fourth driving signal SX.

As shown in FIGS. 7 and 8, the present inventive concept may be broadly applied to various pixel circuits including the pixel 21a and the monitoring circuit 22a which further receive an additional signal (e.g. SX) except for the transfer control signal TG, the reset signal RG and the selection signal SEL.

The first row of the monitoring circuit 22a may include the first monitoring circuit, the second monitoring circuit and the third monitoring circuit illustrated in FIG. 4. In addition, the first row of the monitoring circuit 22a may further include a fourth monitoring circuit including a seventh monitoring transistor MXX0 receiving the fourth driving signal SX<0> and an eighth monitoring transistor MSXX0 coupled to the fourth monitoring transistor MXX0 and receiving the selection signal SEL<0>. The fourth monitoring circuit may output a fourth monitoring signal SX_MON. The fourth monitoring circuit may be coupled to a fourth current source CS4.

According to the example embodiment, the monitoring circuit 22a is formed at the dummy area DA of the pixel array 20 so that the driving signal TG, RG, SEL and SX output from the row driver 30 may be monitored by the monitoring circuit 22a. In addition, in a structure including the first semiconductor substrate SD1 where the pixel array 20 is formed and the second semiconductor substrate SD2 where the row driver 30 and the analog-to-digital converter 40 are formed, the monitoring circuit 22a is formed in the dummy area DA of the pixel array 20 so that an increase of a size of the image sensor 10 due to a contact portion connecting the first semiconductor substrate SD1 and the second semiconductor substrate SD2 may be minimized.

Figure 9:
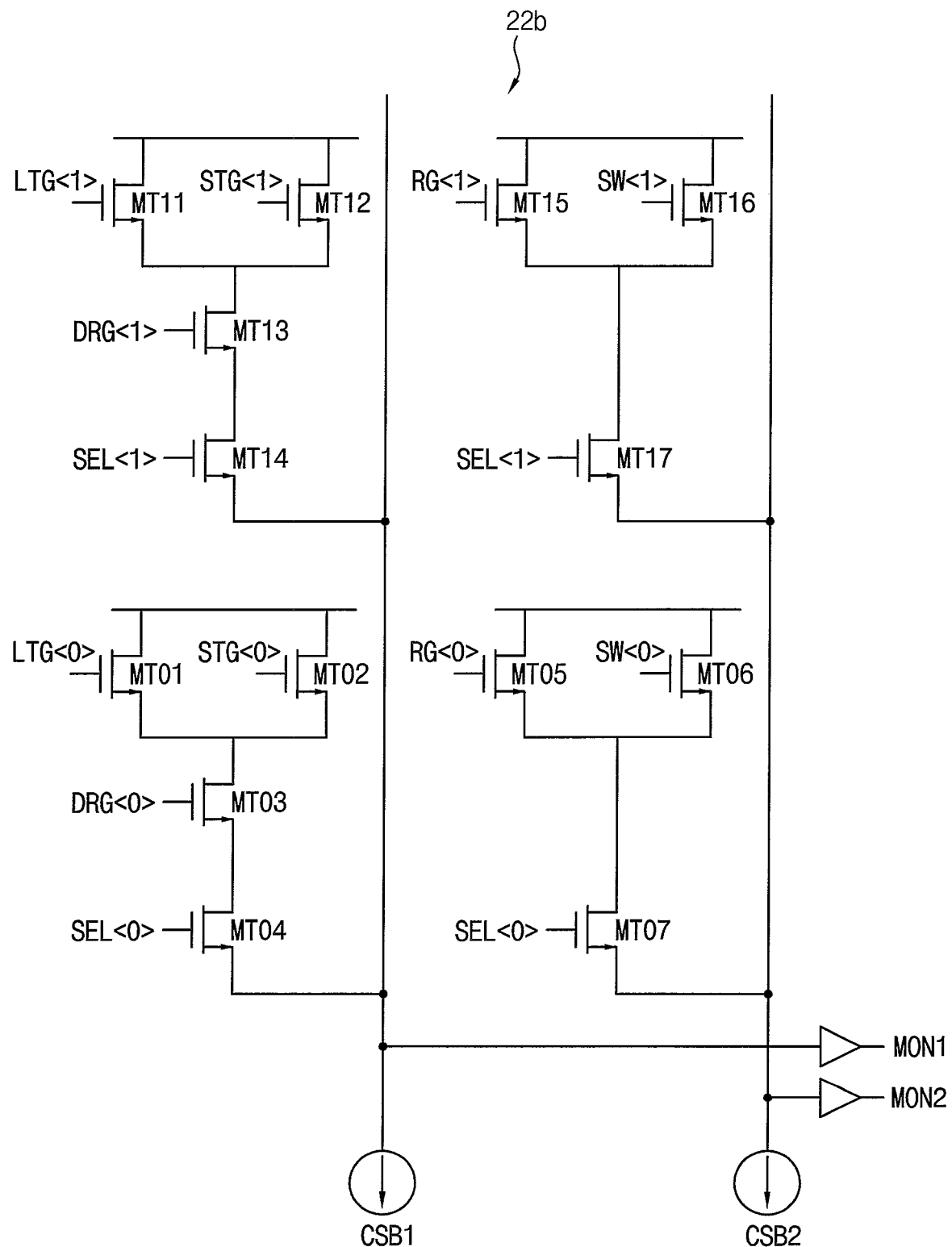
FIG. 9 is a circuit diagram illustrating a monitoring circuit of an image sensor according to example embodiments.

FIG. 9 is a circuit diagram illustrating a monitoring circuit of an image sensor according to example embodiments.

The image sensor and the method of monitoring the image sensor according to the present example embodiment is substantially the same as the image sensor and the method of monitoring the image sensor of the previous example embodiment explained referring to FIGS. 1 to 6 except for the structure of the monitoring circuit of the image sensor. Thus, the same reference numerals will be used to refer to the same or like parts as those described in the previous example embodiment of FIGS. 1 to 6 and any repetitive explanation concerning the above elements will be omitted.

Referring to FIGS. 1, 2 and 9, the pixel and the monitoring circuit 22b receive a first driving signal, a second driving signal, a third driving signal, a fourth driving signal, a fifth driving signal and a sixth driving signal. For example, the first driving signal may be a first transfer control signal LTG of the pixel, the second driving signal may be a second transfer control signal STG, the third driving signal may be a first selection signal DRG of the pixel, the fourth driving signal may be a second selection signal SEL of the pixel, the fifth driving signal may be a second selection signal RG of the pixel and the sixth driving signal may be a switching signal SW of the pixel.

The monitoring circuit 22b may output a first monitoring signal MON1 based on the first driving signal LTG, the second driving signal STG, the third driving signal DRG and the fourth driving signal SEL. The monitoring circuit 22b may output a second monitoring signal MON2 based on the fourth driving signal SEL, the fifth driving signal RG and the sixth driving signal SW.

In the example embodiment, the monitoring circuit 22b may include at least two n-type monitoring transistors which are coupled in parallel and at least two n-type monitoring transistors which are coupled in series.

Each row of the monitoring circuit 22b may include a first monitoring circuit including a first monitoring transistor MT01 and MT11 receiving the first transfer control signal LTG<0> and LTG<1>, a second monitoring transistor MT02 and MT12 coupled to the first monitoring transistor MT01 and MT11 in parallel and receiving the second transfer control signal STG<0> and STG<1>, a third monitoring transistor MT03 and MT13 coupled to the first monitoring transistor MT01 and MT11 and the second monitoring transistor MT02 and MT12 and receiving the first reset signal DRG<0> and DRG<1>, and a fourth monitoring transistor MT04 and MT14 coupled to the third monitoring transistor MT03 and MT13 and receiving the selection signal SEL<0> and SEL<1>. The first monitoring circuit may output the first monitoring signal MON1. The first monitoring circuit may be coupled to a first current source CSB1.

Each row of the monitoring circuit 22b may include a second monitoring circuit including a fifth monitoring transistor MT05 and MT15 receiving the second reset signal RG<0> and RG<1>, a sixth monitoring transistor MT06 and MT16 coupled to the fifth monitoring transistor MT05 and MT15 in parallel and receiving the switching signal SW<0> and SW<1>, a seventh monitoring transistor MT07 and MT17 coupled to the fifth monitoring transistor MT05 and MT15 and the sixth monitoring transistor MT06 and MT16 and receiving the selection signal SEL<0> and SEL<1>. The second monitoring circuit may output the second monitoring signal MON2. The second monitoring circuit may be coupled to a second current source CSB2.

The first monitoring signal MON1 may be generated based on the first to fourth driving signals LTG, STG, DRG and SEL. The second monitoring signal MON2 may be generated based on the fourth to sixth driving signals SEL, RG and SW. The first monitoring signal MON1 may be generated by a logic operation of (LTG OR STG) AND DRG AND SEL. The second monitoring signal MON2 may be generated by a logic operation of (RG OR SW) AND SEL.

According to the example embodiment, the monitoring circuit 22b is formed at the dummy area DA of the pixel array 20 so that the driving signal LTG, STG, DRG, SEL, RG and SW output from the row driver 30 may be monitored by the monitoring circuit 22b. In addition, in a structure including the first semiconductor substrate SD1 where the pixel array 20 is formed and the second semiconductor substrate SD2 where the row driver 30 and the analog-to-digital converter 40 are formed, the monitoring circuit 22b is formed in the dummy area DA of the pixel array 20 so that an increase of a size of the image sensor 10 due to a contact portion connecting the first semiconductor substrate SD1 and the second semiconductor substrate SD2 may be minimized.

Figure 10:
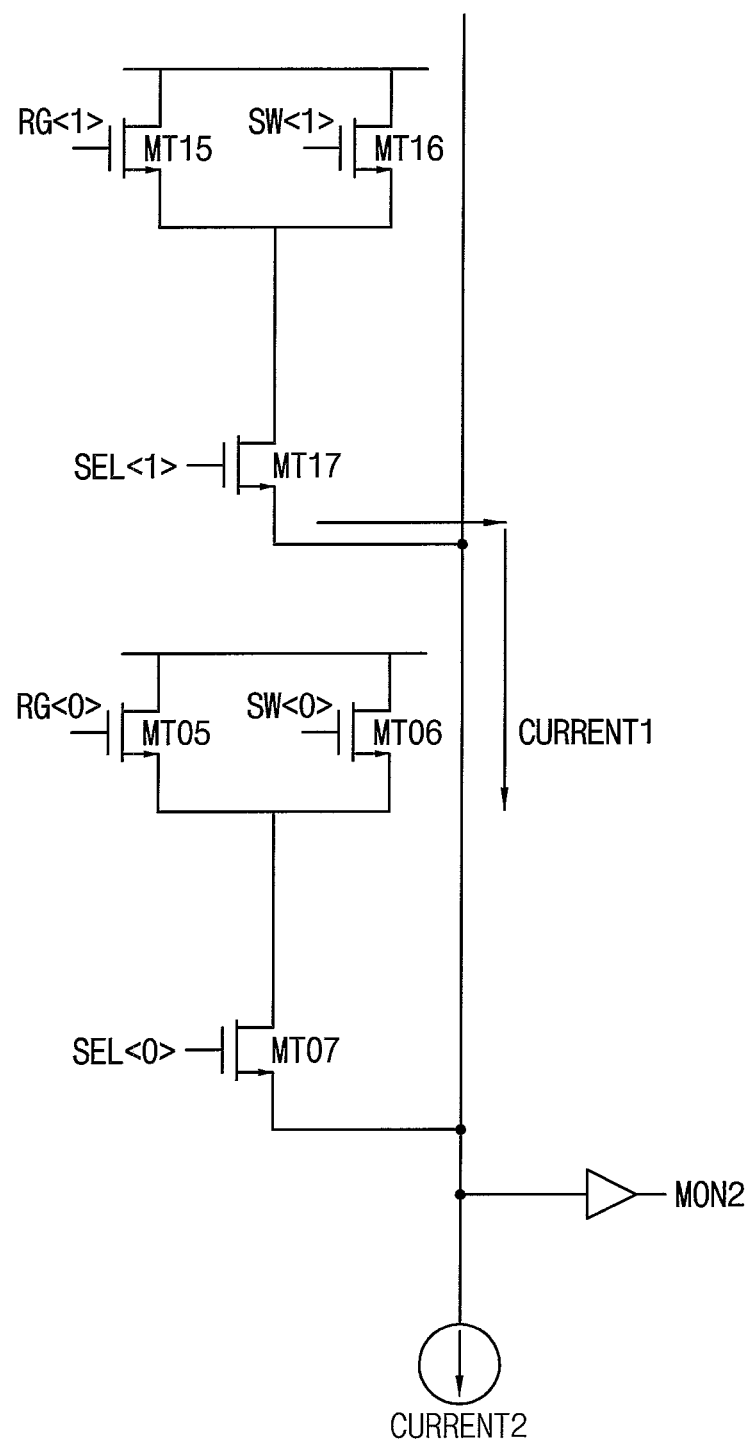
FIG. 10 is a circuit diagram illustrating a portion of the monitoring circuit of FIG. 9.
Figure 11:
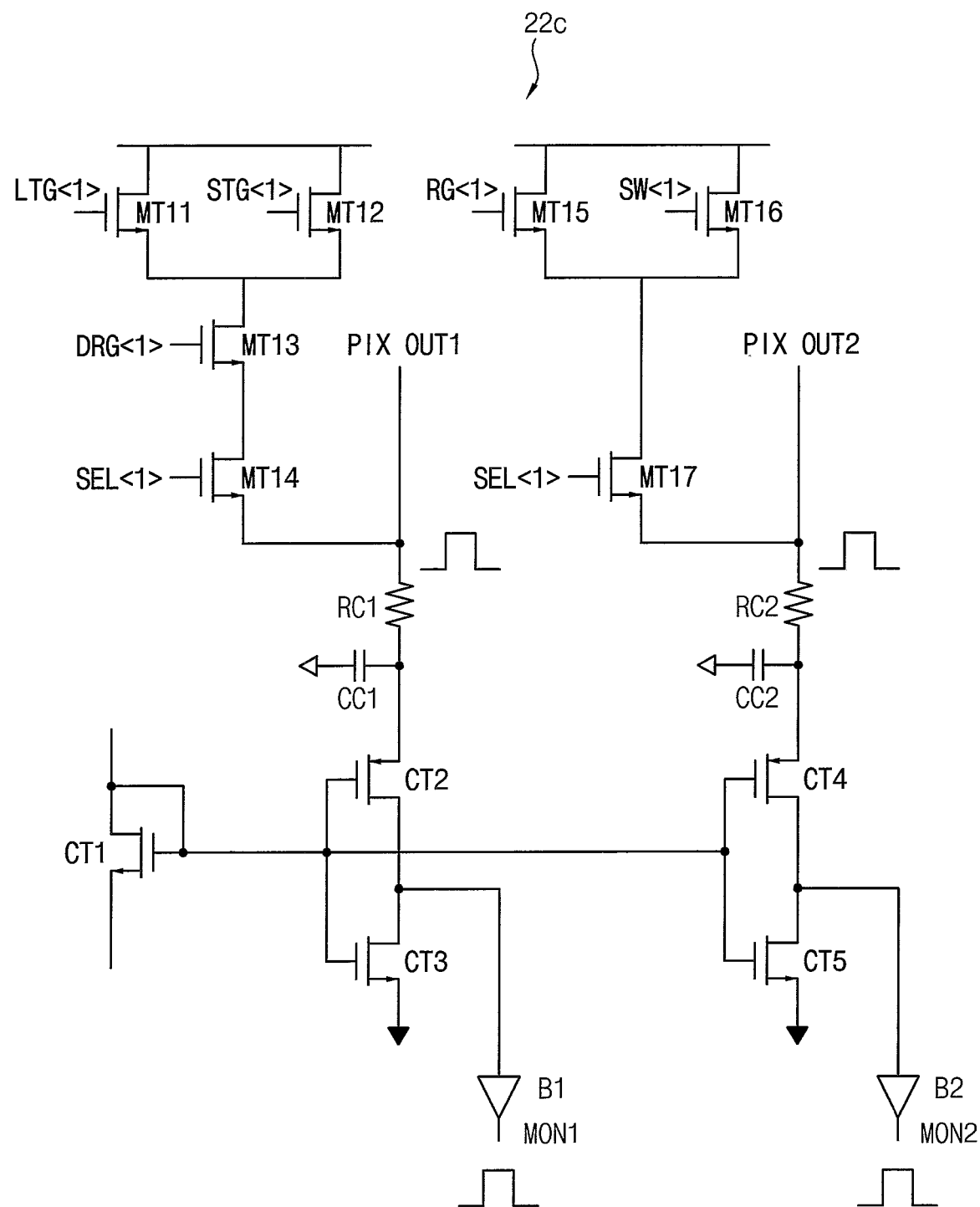
FIG. 11 is a circuit diagram illustrating a monitoring circuit of an image sensor according to example embodiments.

FIG. 10 is a circuit diagram illustrating a portion of the monitoring circuit of FIG. 9. FIG. 11 is a circuit diagram illustrating a monitoring circuit of an image sensor according to example embodiments.

The image sensor and the method of monitoring the image sensor according to the example embodiment is substantially the same as the image sensor and the method of monitoring the image sensor of the previous example embodiment explained referring to FIG. 9 except for the structure of the current source. Thus, the same reference numerals will be used to refer to the same or like parts as those described in the previous example embodiment of FIG. 9 and any repetitive explanation concerning the above elements will be omitted.

In FIG. 10, the monitoring signal extracted from the dummy area DA is represented as a first current CURRENT1 and a current of a current source coupled to the monitoring circuit is represented as a second current CURRENT2. The first current CURRENT1 may mean a current path on the first semiconductor substrate SD1 of FIG. 2. The second current CURRENT2 may mean a current path on the second semiconductor substrate SD2 of FIG. 2.

The first current CURRENT1 may be greater than the second current CURRENT2 or the second current CURRENT2 may be greater than the first current CURRENT1 according to the intensity of the monitoring signal and an intensity setting of the current of the current source.

When the first current CURRENT1 is greater than the second current CURRENT2, the rising operation of the second monitoring signal MON2 may be easy but the falling operation of the second monitoring signal MON2 may be hard. In contrast, when the second current CURRENT2 is greater than the first current CURRENT1, the falling operation of the second monitoring signal MON2 may be easy but the rising operation of the second monitoring signal MON2 may be hard. When there are difficulties of the falling operation or the rising operation, the accuracy of the second monitoring signal MON2 may be reduced so that the error of the pixel array 20 may not be well detected.

The monitoring circuit 22c of FIG. 2 may be substantially the same as the monitoring circuit 22b of FIG. 9 except for the structures of the first current source and the second current source.

In FIG. 11, the first current source of the monitoring circuit 22c may include a first current source transistor CT1, a second current source transistor CT2 and a third current source transistor CT3. Control electrodes of the first current source transistor CT1, the second current source transistor CT2 and the third current source transistor CT3 may be coupled to each other. The monitoring circuit 22c may be coupled to the second current source transistor CT2. The second current source transistor CT2 and the third current source transistor CT3 may be coupled to each other in series.

In the example embodiment, the second current source transistor CT2 may be a p-type transistor. The third current source transistor CT3 may be an n-type transistor.

The second current source transistor CT2 may be turned on and off according to the intensity of the monitoring signal PIX OUT1 (CURRENT1 in FIG. 10). For example, when the monitoring signal PIX OUT1 is equal to or greater than a threshold value, the second current source transistor CT2 may be turned on. When the monitoring signal PIX OUT1 is less than the threshold value, the second current source transistor CT2 may be turned off. Herein, the threshold value may be a sum of a bias current of the current source and a threshold voltage of the second current source transistor CT2.

When the intensity of the monitoring signal PIX OUT1 is great, the second current source transistor CT2 is turned on so that the monitoring signal received to the detector 70 may have a high rising speed. When the intensity of the monitoring signal PIX OUT1 is low, the second current source transistor CT2 is turned off so that the monitoring signal received to the detector 70 may have a high falling speed.

A first resistor RC1 and a first capacitor CC1 may be disposed between the second current source transistor CT2 and an output electrode of the fourth monitoring transistor MT14.

The image sensor may include a first buffer B1 coupled to the detector 70 and outputs the first monitoring signal MON1 to the detector 70. The first buffer B1 may be coupled between the second current source transistor CT2 and the third current source transistor CT3.

In FIG. 11, the second current source of the monitoring circuit 22c may include the first current source transistor CT1, a fourth current source transistor CT4 and a fifth current source transistor CT5. The monitoring circuit 22c may be coupled to the fourth current source transistor CT4. The fourth current source transistor CT4 and the fifth current source transistor CT3 may be coupled to each other in series.

In the present example embodiment, the fourth current source transistor CT4 may be a p-type transistor. The fifth current source transistor CT5 may be an n-type transistor.

The fourth current source transistor CT4 may be turned on and off according to the intensity of the monitoring signal PIX OUT2 (CURRENT1 in FIG. 10).

A second resistor RC2 and a second capacitor CC2 may be disposed between the fourth current source transistor CT4 and an output electrode of the seventh monitoring transistor MT17.

The image sensor may include a second buffer B2 coupled to the detector 70 and outputs the second monitoring signal MON2 to the detector 70. The second buffer B2 may be coupled between the fourth current source transistor CT4 and the fifth current source transistor CT5.

According to the present example embodiment, the monitoring circuit 22c is formed at the dummy area DA of the pixel array 20 so that the driving signal LTG, STG, DRG, SEL, RG and SW output from the row driver 30 may be monitored by the monitoring circuit 22c. In addition, in a structure including the first semiconductor substrate SD1 where the pixel array 20 is formed and the second semiconductor substrate SD2 where the row driver 30 and the analog-to-digital converter 40 are formed, the monitoring circuit 22c is formed in the dummy area DA of the pixel array 20 so that an increase of a size of the image sensor 10 due to a contact portion connecting the first semiconductor substrate SD1 and the second semiconductor substrate SD2 may be minimized.

In addition, the rising speed and the falling speed of the monitoring signal may be enhanced so that the accuracy of the monitoring may be enhanced.

Figure 12:
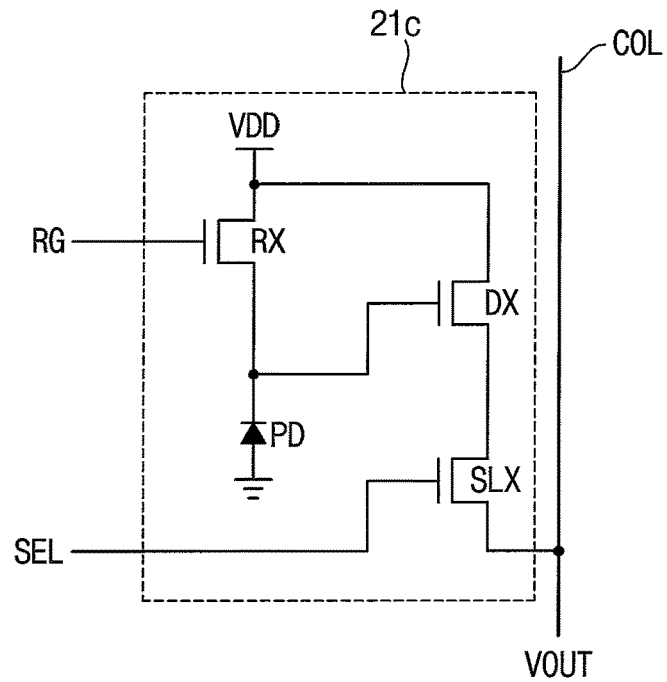
FIG. 12 is a circuit diagram illustrating a pixel of an image sensor according to example embodiments.

FIG. 12 is a circuit diagram illustrating a pixel of an image sensor according to example embodiments.

The image sensor and the method of monitoring the image sensor according to the example embodiment is substantially the same as the image sensor and the method of monitoring the image sensor of the previous example embodiment explained referring to FIGS. 1 to 6 except for the structure of the pixel of the image sensor and the structure of the monitoring circuit. Thus, the same reference numerals will be used to refer to the same or like parts as those described in the previous example embodiment of FIGS. 1 to 6 and any repetitive explanation concerning the above elements will be omitted.

Although the pixel 21 including a single photodiode PD and four transistors TX, RX, DX and SLX is illustrated in FIG. 3, the example embodiments of the present inventive concept may not be limited thereto.

Referring to FIGS. 1, 2, 4 to 6 and 12, the pixel 21c may include a photo-sensitive element such as a photodiode PD, and a readout circuit including a reset transistor RX, a drive transistor DX and a selection transistor SX. In other words, the pixel 21c may have a three-transistor configuration.

Herein, only two driving signals RG and SEL may be applied to the pixel 21c and the monitoring circuit may output the monitoring signals for the two driving signals RG and SEL.

Figure 13:
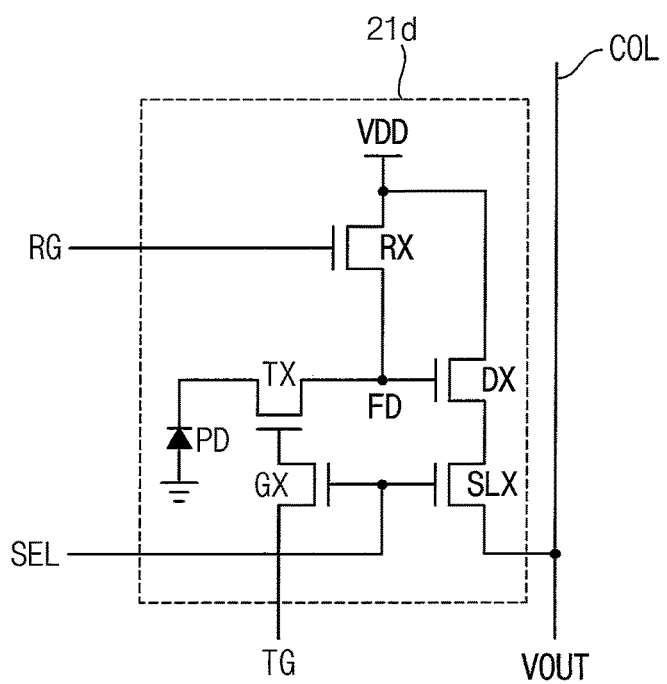
FIG. 13 is a circuit diagram illustrating a pixel of an image sensor according to example embodiments.

FIG. 13 is a circuit diagram illustrating a pixel of an image sensor according to example embodiments.

The image sensor and the method of monitoring the image sensor according to the example embodiment is substantially the same as the image sensor and the method of monitoring the image sensor of the previous example embodiment explained referring to FIGS. 1 to 6 except for the structure of the pixel of the image sensor and the structure of the monitoring circuit. Thus, the same reference numerals will be used to refer to the same or like parts as those described in the previous example embodiment of FIGS. 1 to 6 and any repetitive explanation concerning the above elements will be omitted.

Referring to FIGS. 1, 2, 4 to 6 and 13, the pixel 21d may include a photo-sensitive element such as a photodiode PD, and a readout circuit including a transfer transistor TX, a gate transistor GX, a reset transistor RX, a drive transistor DX and a selection transistor SLX. In other words, the pixel 21d may have a five-transistor configuration. The gate transistor GX may selectively apply the transfer control signal TG to the transfer transistor TX in response to the selection signal SEL.

Herein, three driving signals TG, RG and SEL may be applied to the pixel 21d and the monitoring circuit may output the monitoring signals for the three driving signals TG, RG and SEL.

Figure 14:
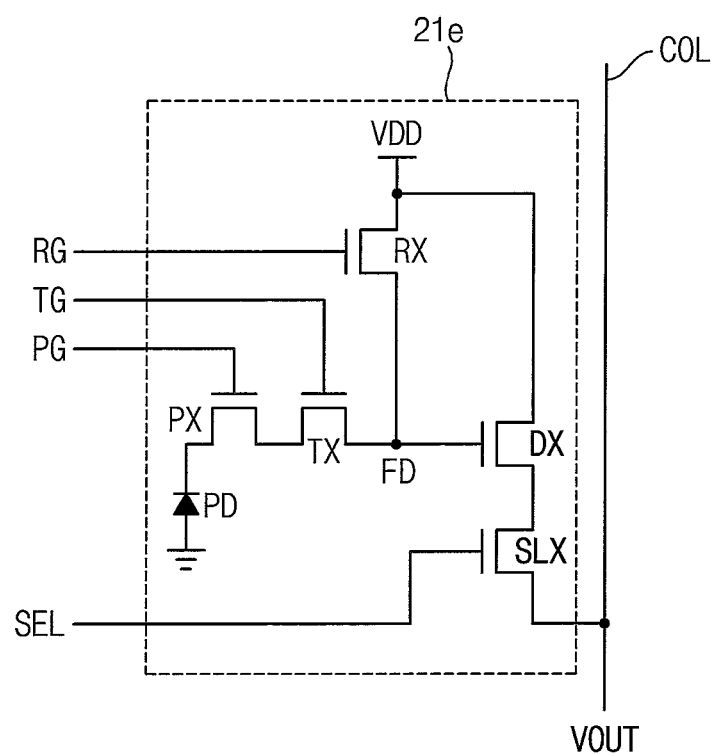
FIG. 14 is a circuit diagram illustrating a pixel of an image sensor according to example embodiments.

FIG. 14 is a circuit diagram illustrating a pixel of an image sensor according to example embodiments.

The image sensor and the method of monitoring the image sensor according to the example embodiment is substantially the same as the image sensor and the method of monitoring the image sensor of the previous example embodiment explained referring to FIGS. 1 to 6 except for the structure of the pixel of the image sensor and the structure of the monitoring circuit. Thus, the same reference numerals will be used to refer to the same or like parts as those described in the previous example embodiment of FIGS. 1 to 6 and any repetitive explanation concerning the above elements will be omitted.

Referring to FIGS. 1, 2, 4 to 6 and 14, the pixel 21e may include a photo-sensitive element such as a photodiode PD, and a readout circuit including a photo transistor PX (or a photogate), a transfer transistor TX, a reset transistor RX, a drive transistor DX and a selection transistor SLX. In other words, the pixel 21e may have a five-transistor configuration. Alternatively, the pixel 21e may have a six-transistor configuration further including a gate transistor or a bias transistor.

The phototransistor PX may be turned on and off in response to a photogate signal PG. While the phototransistor PX is turned on, the photodiode PD may detect the incident light to generate the photo charges. In contrast, while the phototransistor PX is turned off, the photodiode PD may not detect the incident light.

Herein, four driving signals TG, RG, PG and SEL may be applied to the pixel 21e and the monitoring circuit may output the monitoring signals for the four driving signals TG, RG, PG and SEL.

Figure 15:
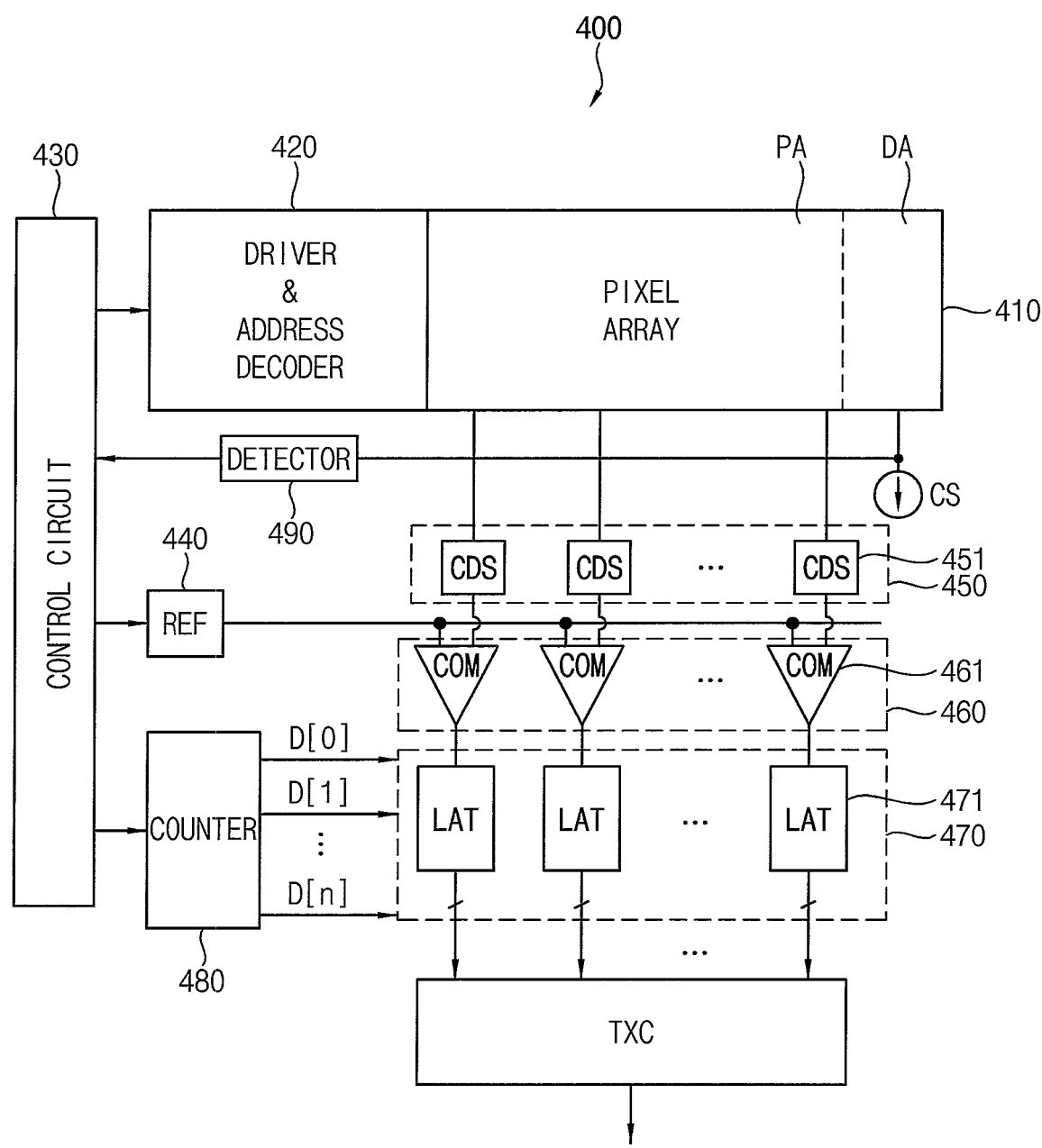
FIG. 15 is a block diagram illustrating an image sensor according to example embodiments.
Figure 16:
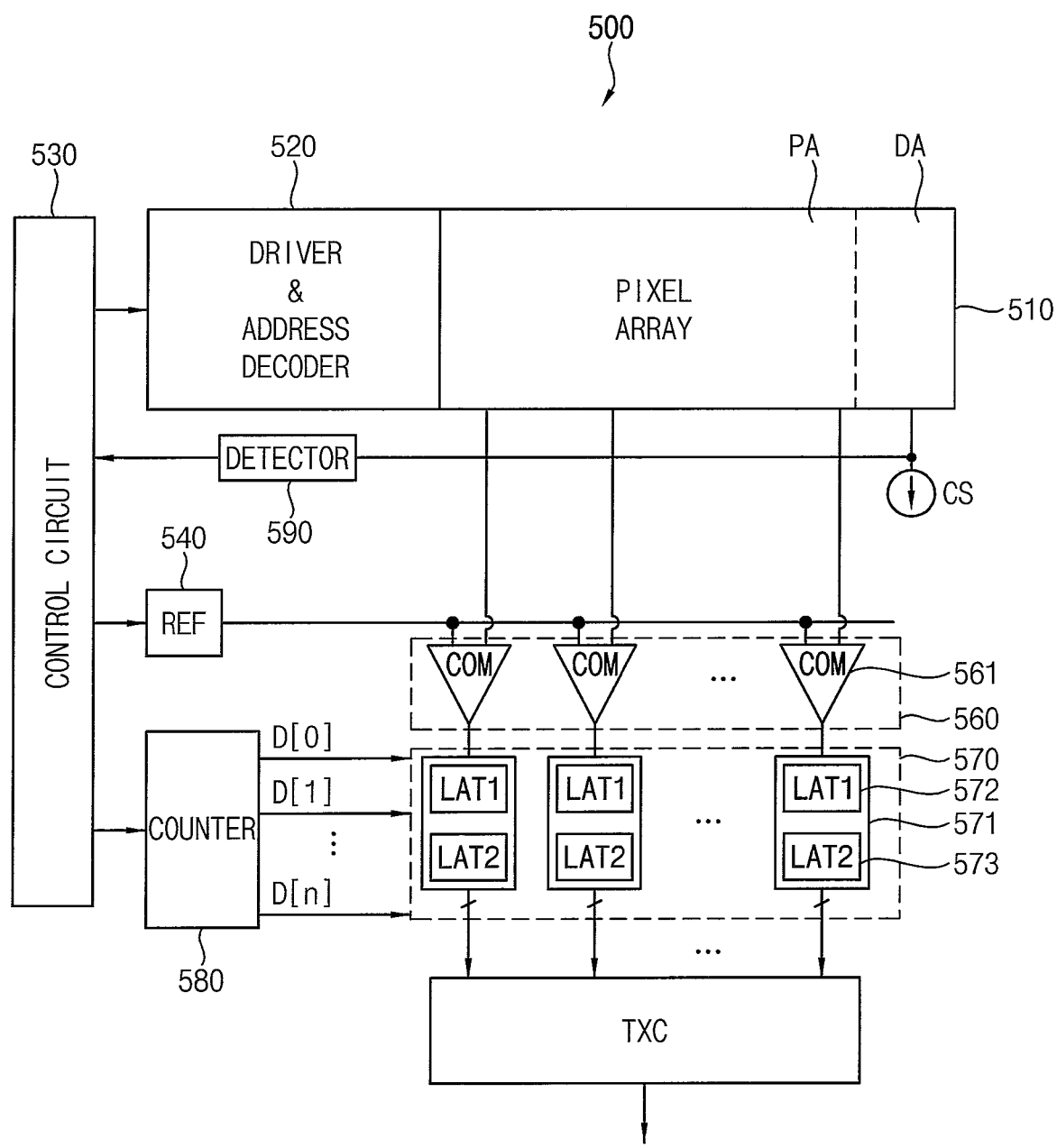
FIG. 16 is a block diagram illustrating an image sensor according to example embodiments.
Figure 17:
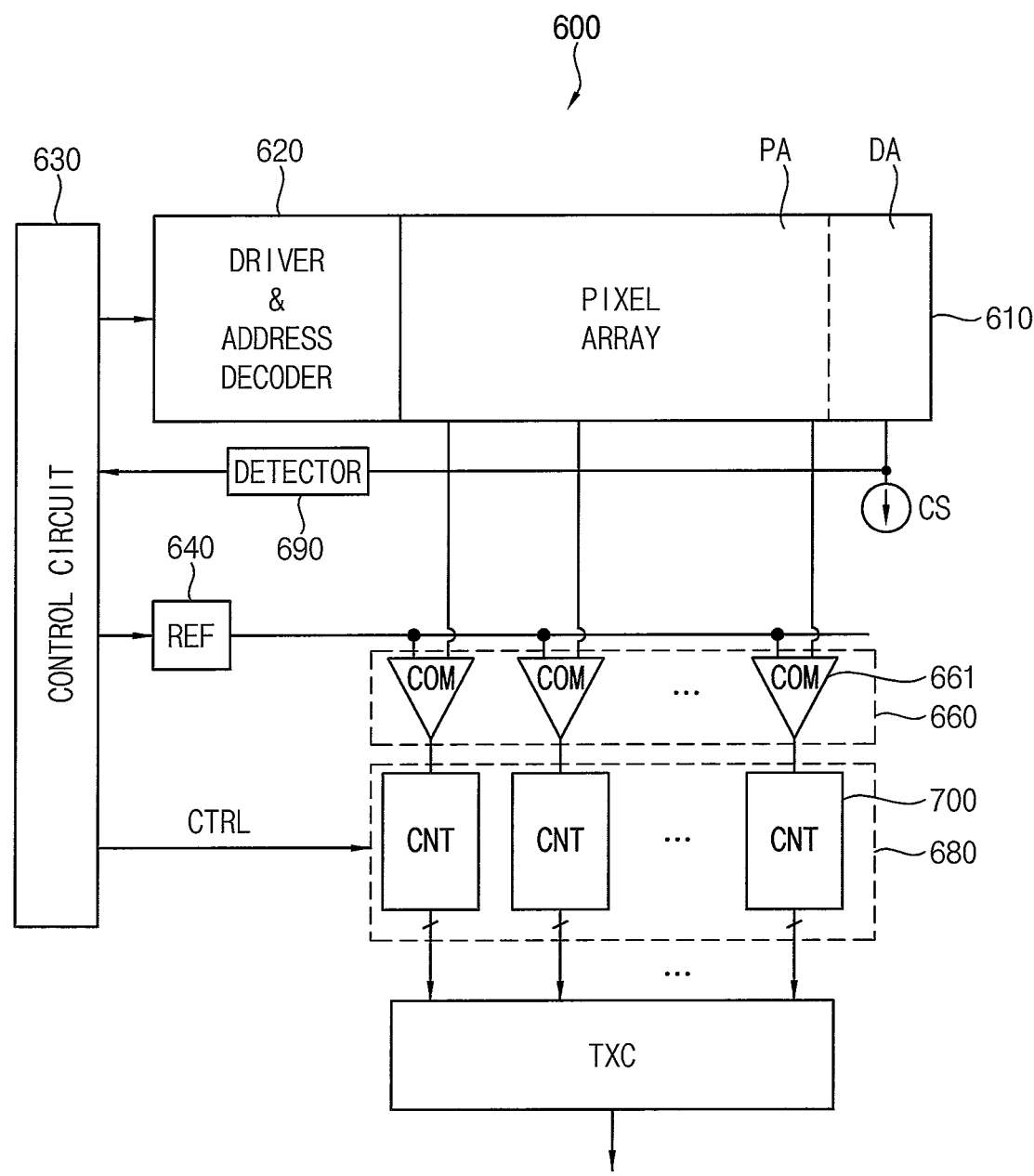
FIG. 17 is a block diagram illustrating an image sensor according to example embodiments.

FIG. 15 is a block diagram illustrating an image sensor according to example embodiments. FIG. 16 is a block diagram illustrating an image sensor according to example embodiments. FIG. 17 is a block diagram illustrating an image sensor according to example embodiments.

Referring to FIG. 15, an image sensor 400 may include a pixel array 410, a driver/address decoder 420, a control circuit 430, a reference signal generator 440, a correlated double sampling (CDS) unit 450, a comparison circuit 460, a latch circuit 470, a counter 480, a detector 490 and a signal transfer circuit TXC.

In the example embodiment, the pixel array 410 may include the pixel area PA and the dummy area DA. The monitoring circuit may be formed in the dummy area DA. The operations of the monitoring circuit and the detector 490 are explained above referring to FIGS. 1 to 14.

In a field of image apparatuses, image sensors of a charge-coupled device (CCD) type or a complementary metal oxide semiconductor (CMOS) type are widely used for capturing an image by sensing incident lights. The image sensor 400 of FIG. 15 may be a CCD image sensor or a CMOS image sensor.

In an example of the CMOS image sensor, the pixel array 410 includes a plurality of pixels for converting incident lights into electrical analog signals.

In the image sensor including unit cells referred to as active pixels or gain cells, a respective signal from each pixel is detected by an address control of the pixels.

The active pixel sensor is a kind of address-controlled image sensor, and the driver/address decoder 420 controls an operation of the pixel array 410 by unit of a column and/or a row. The control circuit 430 generates control signals for controlling operations of the other components of the image sensor 400.

The analog signals detected by the pixel array 410 are converted into digital signals by an analog to digital converter (ADC) including the comparison circuit 460, the latch circuit 470, and the counter 480. The analog signals are output typically column by column, and thus the CDS unit 450, the comparison circuit 460 and the latch circuit 470 include a plurality of CDS circuits 451, a plurality of comparators 461 and a plurality of latches 471 according to the column number of the pixel array 410.

The analog signals output from the pixel array have variations in a reset component due to respective characteristic of each pixel referred to as a fixed pattern noise (FPN) and respective characteristic of each logic circuit for outputting a voltage signal from a corresponding pixel. Accordingly an effective signal component needs to be abstracted by subtracting the respective reset component from the measured signal component. As such, abstracting the effective signal component corresponding to the difference between the reset component and the measured signal component is referred to as CDS.

The CDS unit 450 performs an analog double sampling (ADS) by obtaining the difference between the reset component and the measured signal component using capacitors and switches, and outputs analog signals corresponding to the effective signal components.

The comparison circuit 460 compares the analog signals output column by column from the CDS unit 450 with the reference signal (e.g., the ramp signal RAMP) from the reference signal generator 440, and outputs comparison signals column by column. The comparison signals have respective transition timings according to respective effective signal component. The bit signals D[0], D[1], D[2] and D[3] from the counter 480 are commonly provided to the latches 471. The latches 471 latch the bit signals in response to the respective comparison signals and output the latched digital signals column by column.

In addition to the image sensor 400 performing the ADS, also the comparator according to example embodiments may be adopted in the image sensors performing a digital double sampling (DDS) as will be described referring to FIGS. 16 and 17.

The DDS is one of the CDS where the analog signals corresponding to the reset component and the measured signal component are converted into the digital signals, respectively, and the effective signal component is abstracted by obtaining the difference between the two digital signals.

Referring to FIG. 16, an image sensor 500 may include a pixel array 510, a driver/address decoder 520, a control circuit 530, a reference signal generator 540, a comparison unit 560, a latch unit 570, a counter 580, a detector 590 and a signal transfer circuit TXC.

In the example embodiment, the pixel array 510 may include the pixel area PA and the dummy area DA. The monitoring circuit may be formed in the dummy area DA. The operations of the monitoring circuit and the detector 590 are explained above referring to FIGS. 1 to 14.

The comparison circuit 560 and the latch circuit 570 may include a plurality of comparators 561 and a plurality of latches 571 that are assigned by unit of columns.

The image sensor 500 of FIG. 16 has a configuration for performing the DDS whereas the image sensor 400 of FIG. 15 has a configuration for performing the ADS. Each latch 571 coupled to each column includes a first latch 572 and a second latch 573. The pixel array 510 outputs sequentially a first analog signal and a second analog signal for the CDS, where the first analog signal indicates a reset component and the second analog signal indicates a measured image component.

In a first sampling, each comparator 561 compares the first analog signal indicating the reset component with a ramp signal from the reference signal generator 540, and outputs the comparison signal having a transition time point corresponding to the reset component. Such operations are performed with respect to each column.

The bit signals D[0], D[1], D[2], D[3] from the counter 580 are commonly provided to each latch 571, and each latch 571 latches the bit signals D[0], D[1], D[2], D[3] at each transition time point of the corresponding comparison signal to store a first count value in the first latch 572.

In a second sampling, each comparator 561 compares the second analog signal indicating the measured image component with the ramp signal from the reference signal generator 540, and outputs the comparison signal having a transition time point corresponding to the measured image component. Such operations are performed with respect to each column.

The bit signals D[0], D[1], D[2], D[3] from the counter 580 are commonly provided to each latch 571, and each latch 571 latches the bit signals D[0](or D0), D[1], D[2], D[3] at each transition time point of the corresponding comparison signal to store a second count value in the second latch 573. The first and second count values stored in the first and second latches 572 and 573 are provided to internal logic circuits to calculate values corresponding to the effective image components. As such, the DDS may be performed by the image sensor 500.

The image sensors 400 and 500 of FIGS. 15 and 16 include the common counter for performing the CDS. Also an image sensor may include a plurality of counters coupled to column by column as illustrated in FIG. 17, which may be referred to as column counters.

Referring to FIG. 17, an image sensor 600 may include a pixel array 610, a driver/address decoder 620, a control circuit 630, a reference signal generator 640, a comparison circuit 660, a counting block 680, a detector 690 and a signal transfer circuit TXC.

In the example embodiment, the pixel array 610 may include the pixel area PA and the dummy area DA. The monitoring circuit may be formed in the dummy area DA. The operations of the monitoring circuit and the detector 690 are explained above referring to FIGS. 1 to 14.

The analog signals detected by the pixel array 610 are converted into digital signals by an ADC including the comparison circuit 660 and the counting block 680. The analog signals are output column by column, and thus the comparison circuit 660 and counting block 680 include a plurality of comparators 661 and a plurality of counters 700 according to the column number of the pixel array 610.

Using the plurality of comparators 661 and counters 700 coupled to each column, the image sensor 600 may simultaneously process a plurality of pixel signals corresponding one row, thereby enhancing an operation speed and reducing noises.

The pixel array 610 outputs sequentially a first analog signal and a second analog signal for the CDS, where the first analog signal indicates a reset component and the second analog signal indicates a measured image component. Based on the first and second analog signals, the ADC including the comparison circuit 660 and the counting block 680 performs the CDS digitally, that is, performs the DDS with respect to the respective columns.

Figure 18:
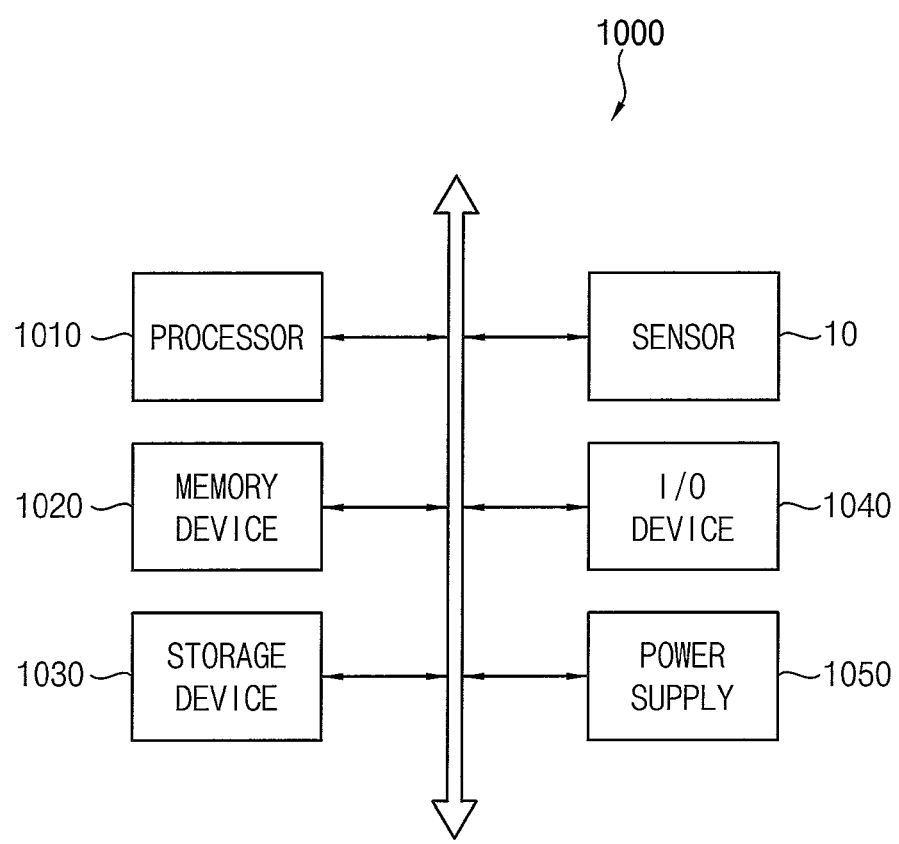
FIG. 18 is a block diagram illustrating a computing system including an image sensor according to example embodiments.

FIG. 18 is a block diagram illustrating a computing system including an image sensor according to example embodiments.

Referring to FIG. 18, a computing system 1000 may include a processor 1010, a memory device 1020, a storage device 1030, an input/output device 1040, a power supply 1050 and an image sensor 10. According to some example embodiments, the computing system 1000 may further include ports that communicate with a video card, a sound card, a memory card, a universal serial bus (USB) device, and/or other electronic devices.

The processor 1010 may perform various calculations or tasks. According to some embodiments, the processor 1010 may be a microprocessor or a central processing unit (CPU).

The processor 1010 may communicate with the memory device 1020, the storage device 1030, the image sensor 10 and the input/output device 1040 via an address bus, a control bus, and/or a data bus.

In some example embodiments, the processor 1010 may be coupled to an extended bus, such as a peripheral component interconnection (PCI) bus.

The memory device 1020 may store data for operating the computing system 1000. For example, the memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device.

The storage device 1030 may include a solid-state drive (SSD), a hard disk drive (HDD), a compact-disc read-only memory (CD-ROM), etc. The input/output device 1040 may include an input device (e.g., a keyboard, a keypad, a mouse, etc.) and an output device (e.g., a printer, a display device, etc.). The power supply 1050 supplies operation voltages for the computing system 1000.

The image sensor 10 may communicate with the processor 1010 via buses or other communication links.

The image sensor 10 may include the monitoring circuit formed in the dummy area DA of the pixel array 20 as described above.

According to an example embodiment, the monitoring circuit may be formed at the dummy area DA of the pixel array 20 so that the driving signal output from the row driver 30 may be monitored by the monitoring circuit. In addition, in a structure including the first semiconductor substrate SD1 where the pixel array 20 is formed and the second semiconductor substrate SD2 where the row driver 30 and the analog-to-digital converter 40 are formed, the monitoring circuit is formed in the dummy area DA of the pixel array 20 so that an increase of a size of the image sensor 10 due to a contact portion connecting the first semiconductor substrate SD1 and the second semiconductor substrate SD2 may be minimized.

The example embodiments of the inventive concept of the disclosure explained above may be applied to devices and systems including the image sensor.

For example, the inventive concept may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. An image sensor comprising:
a pixel array including a pixel area and a dummy area, the pixel area including a pixel, the dummy area including a monitoring circuit, and the dummy area being provided on a same substrate as the pixel area and adjacent to the pixel area;
a row driver configured to output a plurality of driving signals to the pixel and the monitoring circuit;
a detector circuit configured to receive a plurality of monitoring signals from the monitoring circuit, each of the plurality of monitoring signals corresponding to a respective one of the plurality of driving signals;
an analog-to-digital converter configured to receive an analog signal corresponding to an incident light from the pixel and to convert the analog signal to a digital signal; and
a controller circuit configured to control the row driver and the analog-to-digital converter,
wherein the monitoring circuit comprises at least two n-type monitoring transistors coupled to each other in series.

2. The image sensor of claim 1, wherein the dummy area is provided on a first side of the pixel area, and
wherein the row driver is provided on a second side of the pixel area different from the first side of the pixel area.

3. The image sensor of claim 1, wherein the pixel array is provided on a first semiconductor substrate, and wherein the row driver, the detector circuit, the analog-to-digital converter and the controller circuit are provided on a second semiconductor substrate overlapping the first semiconductor substrate.

4. The image sensor of claim 1, wherein the pixel and the monitoring circuit are configured to receive the plurality of driving signals, which include a first driving signal, a second driving signal and a third driving signal,
wherein the monitoring circuit is configured to output the plurality of monitoring signals, which include a first monitoring signal based on the first driving signal and the third driving signal, output a second monitoring signal based on the second driving signal and the third driving signal and output a third monitoring signal based on the third driving signal.

5. The image sensor of claim 4, wherein the first driving signal is a transfer control signal of the pixel,
wherein the second driving signal is a reset signal of the pixel, and
wherein the third driving signal is a selection signal of the pixel.

6. The image sensor of claim 5, wherein the pixel includes:
a photodiode;
a transfer transistor coupled to the photodiode and configured to receive the transfer control signal;
a reset transistor configured to receive the reset signal;
a selection transistor configured to receive the selection signal; and
a drive transistor coupled to the selection transistor in series.

7. The image sensor of claim 5, wherein the monitoring circuit comprises:
a first monitoring circuit including a first monitoring transistor configured to receive the transfer control signal and a second monitoring transistor coupled to the first monitoring transistor and configured to receive the selection signal, the first monitoring circuit being configured to output the first monitoring signal;
a second monitoring circuit including a third monitoring transistor configured to receive the reset signal and a fourth monitoring transistor coupled to the third monitoring transistor and configured to receive the selection signal, the second monitoring circuit being configured to output the second monitoring signal; and
a third monitoring circuit including a fifth monitoring transistor configured to receive the selection signal and a sixth monitoring transistor coupled to the fifth monitoring transistor and configured to receive the selection signal, the third monitoring circuit being configured to output the third monitoring signal.

8. The image sensor of claim 4, wherein the pixel and the monitoring circuit are configured to further receive a fourth driving signal,
wherein the monitoring circuit is configured to further output a fourth monitoring signal based on the third driving signal and the fourth driving signal.

9. The image sensor of claim 1, wherein the pixel and the monitoring circuit are configured to receive a first driving signal, a second driving signal, a third driving signal, a fourth driving signal, a fifth driving signal and a sixth driving signal, and
wherein the monitoring circuit is configured to output the plurality of monitoring signals, which include a first monitoring signal based on the first driving signal, the second driving signal, the third driving signal and the fourth driving signal and output a second monitoring signal based on the fourth driving signal, the fifth driving signal and the sixth driving signal.

10. The image sensor of claim 9, wherein the first driving signal is a first transfer control signal of the pixel,
wherein the second driving signal is a second transfer control signal of the pixel,
wherein the third driving signal is a first reset signal of the pixel,
wherein the fourth driving signal is a selection signal of the pixel,
wherein the fifth driving signal is a second reset signal of the pixel, and
wherein the sixth driving signal is a switching signal of the pixel.

11. The image sensor of claim 10, wherein the monitoring circuit comprises:
a first monitoring circuit including a first monitoring transistor configured to receive the first transfer control signal, a second monitoring transistor coupled to the first monitoring transistor in parallel and configured to receive the second transfer control signal, a third monitoring transistor coupled to the first monitoring transistor and the second monitoring transistor and configured to receive the first reset signal and a fourth monitoring transistor coupled to the third monitoring transistor and configured to receive the selection signal, the first monitoring circuit configured to output the first monitoring signal; and
a second monitoring circuit including a fifth monitoring transistor configured to receive the second reset signal, a sixth monitoring transistor coupled to the fifth monitoring transistor in parallel and configured to receive the switching signal, a seventh monitoring transistor coupled to the fifth monitoring transistor and the sixth monitoring transistor and configured to receive the selection signal, the second monitoring circuit configured to output the second monitoring signal.

12. The image sensor of claim 1, further comprising a current source coupled to the monitoring circuit and the detector circuit,
wherein the current source comprises a first current source transistor, a second current source transistor and a third current source transistor,
wherein control electrodes of the first current source transistor, the second current source transistor and the third current source transistor are coupled to each other,
wherein the monitoring circuit is coupled to the second current source transistor,
wherein the second current source transistor and the third current source transistor are coupled to each other in series, and
wherein the second current source transistor is a p-type transistor and the third current source transistor is an n-type transistor.

13. The image sensor of claim 12, wherein the second current source transistor is configured to be turned on and off according to an intensity of one of the monitoring signals.

14. The image sensor of claim 13, wherein when the one of monitoring signals is equal to or greater than a threshold value, the second current source transistor is turned on, and
wherein the one of monitoring signals is less than the threshold value, the second current source transistor is turned off.

15. The image sensor of claim 12, further comprising a buffer coupled to the detector circuit, wherein the buffer is coupled to between the second current source transistor and the third current source transistor.

16. The image sensor of claim 1, wherein the monitoring circuit comprises at least two second n-type monitoring transistors coupled to each other in parallel and one n-type monitoring transistor coupled to the two second n-type monitoring transistors in series.

17. The image sensor of claim 1, wherein, for each readout period, the monitoring circuit is configured to output the plurality of monitoring signals.

18. The image sensor of claim 1, wherein the monitoring circuit comprises a plurality of monitoring circuits, each configured to separately output one of the plurality of monitoring signals.

19. The image sensor of claim 1, wherein the monitoring circuit comprises a plurality of current sources, each separately corresponding to one of the plurality of monitoring signals.

20. An image sensor comprising:
a pixel array comprising a pixel area including a pixel and a dummy area including a first monitoring circuit, a second monitoring circuit and a third monitoring circuit,
a row driver configured to output a driving signal to the pixel, the first monitoring circuit, the second monitoring circuit and the third monitoring circuit; and
a detector circuit configured to receive a first monitoring signal, a second monitoring signal and a third monitoring signal from the first monitoring circuit, the second monitoring circuit and the third monitoring circuit respectively,
wherein the first monitoring circuit comprises a first monitoring transistor configured to receive a transfer control signal and a second monitoring transistor coupled to the first monitoring transistor and configured to receive a selection signal, the first monitoring circuit being configured to output the first monitoring signal,
wherein the second monitoring circuit comprises a third monitoring transistor configured to receive a reset signal and a fourth monitoring transistor coupled to the third monitoring transistor and configured to receive the selection signal, the second monitoring circuit being configured to output the second monitoring signal,
wherein the third monitoring circuit comprising a fifth monitoring transistor configured to receive the selection signal and a sixth monitoring transistor coupled to the fifth monitoring transistor and configured to receive the selection signal, the third monitoring circuit being configured to output the third monitoring signal.

21. An image sensor comprising:
a pixel array;
a pixel provided on a pixel area of the pixel array;
a monitoring circuit provided on a dummy area of the pixel array;
a row driver configured to output a plurality of driving signals to the pixel and the monitoring circuit;
a detector circuit configured to receive a plurality of monitoring signals from the monitoring circuit and detect an error in the pixel array based on the plurality of monitoring signals, each of the plurality of monitoring signals corresponding to a respective one of the plurality of driving signals,
wherein the dummy area disposed on a same substrate as the pixel area and the dummy area disposed adjacent to the pixel area, and
wherein the monitoring circuit comprises at least two n-type monitoring transistors coupled to each other in series.

* * * * *